INVENTOR.
JOHN B. RUST,
BY
ATTORNEY.

United States Patent Office 3,556,790
Patented Jan. 19, 1971

3,556,790
PHOTOGRAPHIC PHOTOPOLYMERIZATION AND VIEWING PROCESS
John B. Rust, Los Angeles, Calif., assignor to Hughes Aircraft Company, Culver City, Calif., a corporation of Delaware
Filed Feb. 16, 1967, Ser. No. 616,599
Int. Cl. G03c 5/04
U.S. Cl. 96—27                    15 Claims

ABSTRACT OF THE DISCLOSURE

The discovery provides an optical method and compositions for effecting the production of a photopolymer image in a photopolymerizable composition with actinic light of high absorption intensity and enabling subsequent viewing of the created image with actinic light of low absorption intensity, with or without fixing, of the photopolymerization image, and the product thereof.

---

The present invention relates to viewing photopolymer images and, more specifically, to irradiation of photosensitive media containing photopolymer images for significant periods of time without producing background fog.

When a photosensitive medium containing a polymerizable monomer is exposed to a light source, a photopolymer image is formed in the exposed area of the medium. At present, in order to view the photopolymer image, the still photosensitive portion of the photosensitive medium must be desensitized. Following such desensitization, the now photo-insensitive medium can be re-exposed to light for viewing the photopolymer image without creating background fog. However, the presently known methods of desensitizing photosensitive compositions, in general, require at least some period of time, e.g., several minutes or more for desensitizing and the completion of the desensitization step. It would be advantageous to have a method which permits instantaneous viewing of a photopolymer image and which permits viewing of the image for a substantial time without creating background fogging, that is, without causing polymerization of the initially unexposed areas of the composition. Furthermore, a method permitting instantaneous viewing of a photopolymer image would be especially advantageous if it did not require any addition to the photosensitive medium of agents not essential to the formation of a photopolymer image.

Bearing in mind the foregoing, it is a major object of the present invention to provide a method for viewing a photopolymer image in a photosensitive medium immediately after the production thereof without producing any significant background fogging for substantial periods of time.

It is a further object of this invention to provide a method for viewing photosensitive media containing photopolymer images, which method is completely optical and depends only upon the wavelength of the irradiating light.

It is a still further object of this invention to provide a method for viewing a photopolymer image in a photosensitive medium without producing background fog without the need for the addition of extraneous agents, and, after such viewing to subsequently fix the photosensitive medium by any one of a number of known fixing methods.

It is an even further object of this invention to provide a method for immediately viewing a photopolymer image produced upon irradiation of a photosensitive medium containing a polymerizable monomer and a photo-redox catalyst system.

It is another object of the invention to provide immediate viewing of a polymerized image under light such that it appears more optically dense than in the light required for polymerization.

Other objects and advantages will become apparent from the following description and drawings, in which.

Figure 1:
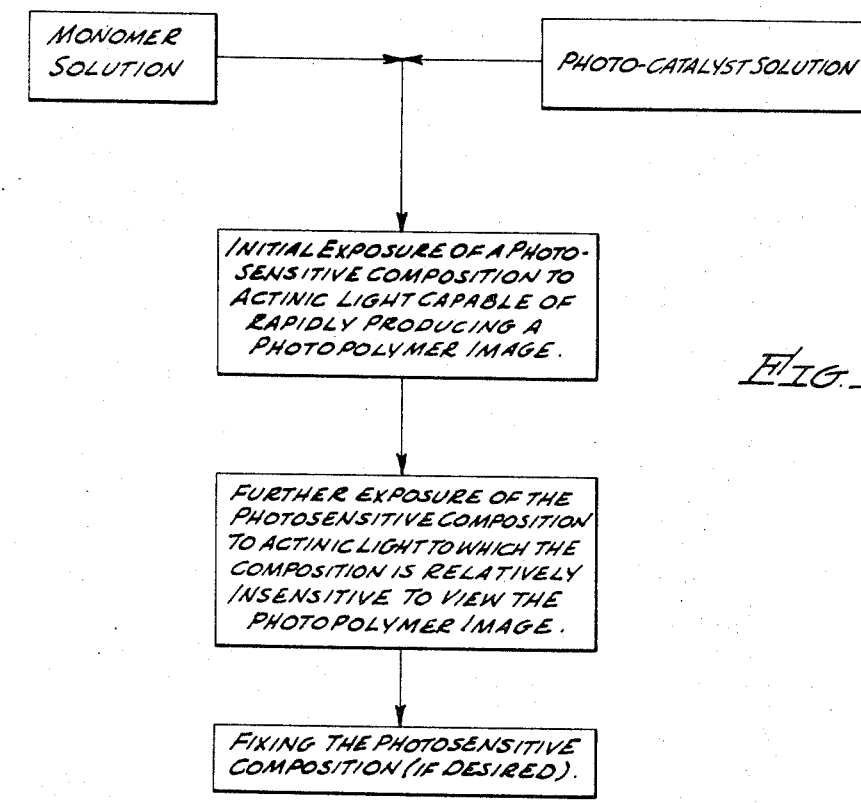
FIG. 1 is a block diagram of the steps constituting the method of this invention.

In general, the method of this invention comprises the sequential steps of: (1) recording information on a photosensitive medium in the form of a photopolymer image by initially irradiating the photosensitive medium with actinic light to which the medium is relatively highly sensitive; (2) viewing the recorded information by uniformly irradiating the photosensitive medium with visible actinic light to which the photosensitive medium is relatively insensitive; and (3) fixing the photosensitive medium if it is desired to form a permanent record. These steps are illustrated in FIG. 1 following formation of a photosensitive composition from its components. More specifically, the method of this invention accomplishes the above steps (1), (2) and (3) by appropriate irradiation of photosensitive media containing photo-oxidants each of which exhibits marked differences in its absorption sensitivity to the radiant energy capable of inducing polymerization in such media.

The photocatalysts used herein are, at least, capable of inducing polymerization when irradiated with light in the visible region between about 3800 A. and about 7200 A. Such photocatalysts may also be capable of inducing polymerization when irradiated with radiant energy having wavelengths lying in the wavelength region outside the visible region. However, it is necessary that these photocatalysts weakly absorb light in some part of the visible region as compared with their stronger energy absorption in other parts of the visible region or in the wavelength regions outside the visible region. Thus, by irradiating photosensitive media containing dyes used in this invention with light in the particular region to which the dye is highly sensitive, a photopolymer image is rapidly formed, whereas when the same photosensitive media are irradiated by light in the particular region to which the dye is substantially insensitive, substantially no polymerization occurs for a significant length of time. Therefore, it is possible to view a photopolymer image in a photosensitive medium containing dyes exhibiting the above-identified characteristics by exposure of such compositions to visible light without producing background fog which would blur photopolymer image detail.

In general, the process of this invention is applicable to photosensitive compositions comprising a photopolymerizable monomer and a photo-redox catalyst system. The photo-redox catalyst system itself comprises: (a) a photo-oxidant having the aforementioned absorption characteristics and (b) a catalyst capable of reacing with the photo-oxidant in its activated state to form a free radical by transfer of an electron from the catalyst to the photo-oxidant. The process of this invention is also applicable to photosensitive compositions comprising a polymerizable monomer and other photocatalyst, as described hereinafter.

Theoretically, the photo-oxidant strongly absorbs light having wavelengths lying in any wavelength range within the visible spectrum, but weakly absorbs in some other wavelength region lying within said visible spectrum of between about 3800 A. and about 7200 A. Preferably, however, the photo-oxidants used herein strongly absorb light having wavelengths lying in the wavelength region between about 5400 A. and about 7200 A. (hereafter designated as the "5400–7200 A. region"). These photo-oxidants only weakly absorb light having wavelengths lying in the 3800 A. to 5400 A. region. The cutoff wavelength of about 5400 A. is not a sharp cutoff, but, instead, occurs over a wavelength region between about 5200 A. and about 5600 A. That is, the photo-oxidants show a marked difference in absorption of light having wavelengths below about 5200 A. as compared with their strong absorption in the wavelength region above about 5600 A. with a transition area between about 5200 A. and about 5600 A.

Instantaneous viewing of a photopolymer image is possible when any photosensitive composition is irradiated with visible actinic light provided additional steps have not been taken to presensitize or remove the polymerization inhibitors from the composition. However, the time during which photosensitive compositions can be viewed without causing polymerization of the initially unexposed areas is determined by the length of the induction period associated with the irradiating or viewing light. The induction period is a measurement of the time elapsing before any polymerization will occur in a photosensitive composition when such composition is irradiated with actinic light. The induction period for any particular photosensitive composition varies with the wavelength of the actinic light. Thus, a photopolymer image in a particular photosensitive composition may be instantaneously viewed and viewed for a length of time dependent upon the wavelength of the actinic light used to view the image. Therefore, a photosensitive composition exhibiting marked differences in sensitivity to various wavelength regions within the visible spectrum can be viewed by uniformly irradiating the composition with actinic light within the visible region to which the photosensitive composition is relatively insensitive.

Figure 3:
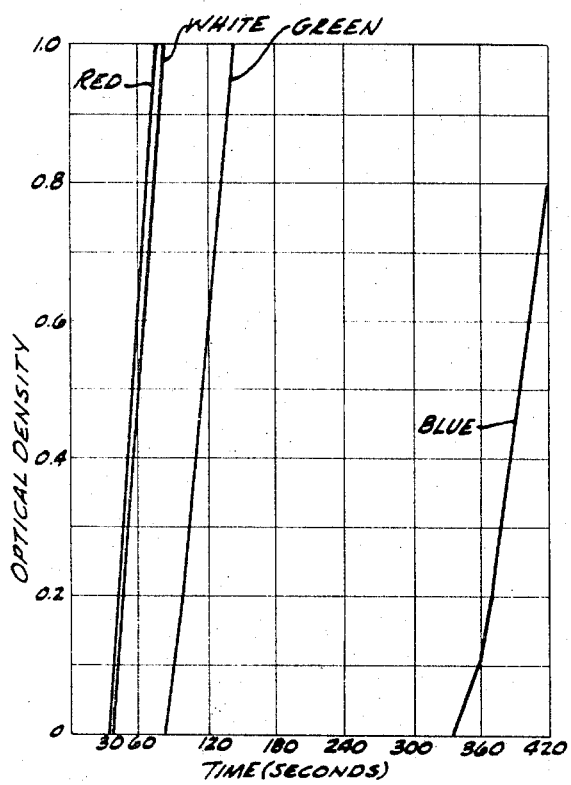
FIGS. 3, 4 and 5 are graphical representations of increases in optical density of photosensitive compositions of this invention when such compositions are irradiated with actinic light of different wavelengths at a constant incident light intensity.
Figure 5:
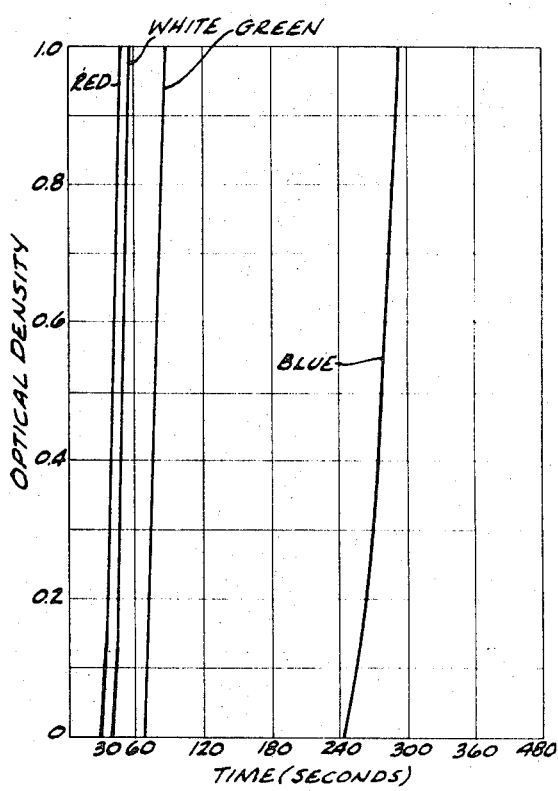
Figure 4:
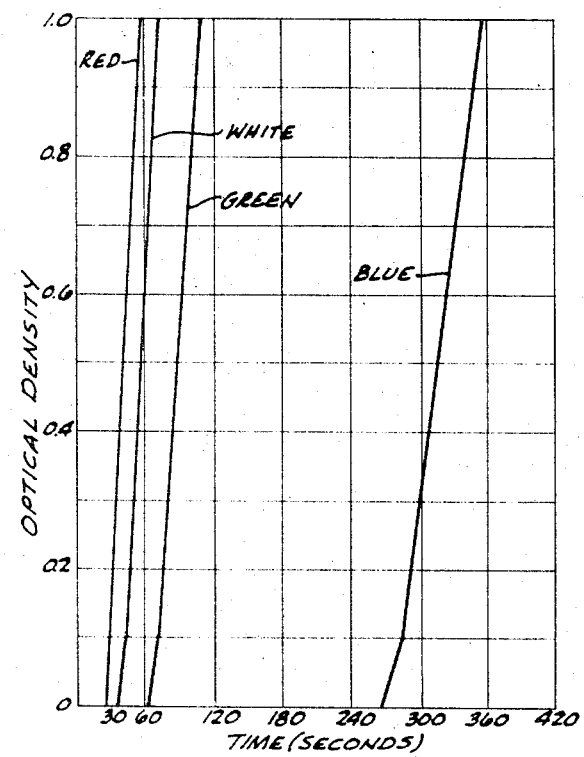

This phenomenon can be seen from an examination of FIGS. 3, 4 and 5 which represent curve plots of the results derived as disclosed in Examples 2, 3 and 4 employing representative photo-oxidants. The procedure and compositions employed in each of Examples 2, 3 and 4 were essentially identical, except that various polymerizable monomers were used in the photosensitive compositions. A series of photosensitive compositions were made up comprising a polymerizable monomer, an organic sulfinic acid derivative as the catalyst and methylene blue having absorption peaks at 6100 A. and at 6700 A. as the photo-oxidant. Each of these photosensitive compositions was irradiated with light having various wavelength ranges within the visible spectrum for a time sufficient to produce a measurable optical density. The intensity of the light incident to the surface of the photosensitive compositions was adjusted so that it was a constant independent of the color filter used.

The results are graphically represented in FIGS. 3, 4 and 5. In each of these figures, it will be noted that the induction periods vary considerably with the type of light being used. For example, in FIG. 3 the induction period for blue light having wavelengths up to about 5600 A. and overlapping the methylene blue absorption spectrum only slightly is about 335 seconds. This is to be compared with an induction period of about 30 seconds for red light lying substantially in the wavelength region above 5600 A. and largely overlapping the methylene blue absorption spectrum.

The foregoing differences in length of the induction period when the photosensitive compositions are irradiated with actinic light of varying wavelengths can be shown for all the photo-oxidants disclosed herein. Thus, it will be apparent that visible actinic light comprising wavelengths which produce relatively long induction periods can be used to view a photopolymer image without producing background fogging.

Ideally, it would be preferable to employ a photo-oxidant which did not absorb any light in one wavelength region but which strongly absorbed light in another wavelength region. In this ideal situation, light in the non-absorbing wavelength region could be used for an infinite time to view a photopolymer image in a photosensitive medium containing such a dye. However, real dyes absorb with varying degrees of sensitivity over much of the visible light spectrum. Therefore, since the photo-oxidants or dyes absorb to some extent over most of the 3800 A. to 7200 A. region, it is preferable to employ photo-oxidants which exhibit strong absorption peaks in the 5400–7200 A. region, as compared with their absorption peaks in the 3800–5400 A. region. Generally, selection of a photo-oxidant in this manner permits longer viewing periods, provided irradiating light of appropriate wavelength is used, because (1) the initial actinic light exposure will result in a photopolymer image of maximal density per unit exposure time, thereby requiring greater background fogging before the image outline is significantly blurred and because (2) a larger flux of the weakly absorbed radiation employed in the viewing phase will be required to produce a background density similar to the photopolymer image density.

The viewing light can be optimized by judicious choice of filters so that wavelengths which may be strongly absorbed by the dye are removed from the viewing light. When a strongly red-absorbing dye is present in the photosensitive composition, use of substantially blue light, in addition to not initiating any measurable polymerization for relatively long times, has the further advantage of, in effect, increasing the speed of photosensitive compositions when the photopolymer image consists of numerous, light-scattering colloidal particles. It has been found that such colloidal particles scatter some red light and permit the remaining red light to pass through the photosensitive medium. However, these colloidal particles scatter substantially all blue light. The result is that desensitized photopolymer images irradiated with blue light appear to be much more dense than when irradiated with red light. Experiments have shown that the apparent optical density using blue light is more than three times greater than the apparent optical density when using red light. Thus, even weak images can be easily studied using blue light as a viewing light.

Turning now to the specific components utilizable in the process of this invention, the monomers will first be described. They are the vinyl monomers described in my copending applications entitled "Photopolymers and the Process of Making Same," Ser. No. 450,397, filed Apr. 23, 1965, and Ser. No. 483,986, filed Aug. 31, 1965, now abandoned and replaced by application Ser. No. 824,902 and Ser. No. 824,903 respectively, and assigned to the instant assignee (hereafter referred to as "my copending applications"). The vinyl monomers usable herein include both vinylidene and fluorocarbon monomers. Specific examples of vinyl monomers are butadiene, vinyl chloride, vinylidene chloride, vinyl methyl ether, vinyl butyl ether, vinyl butyrate, styrene, vinyl benzoate, methyl methacrylate, calcium diacrylate, barium diacrylate, acrylic acid, acrylonitrile, and acrylamide.

The specific photo-oxidants usable in the process of this invention are those disclosed in my copending applications and are incorporated herein by reference. More specifically, they are members of the quinoidal dye family, such as phenothiazine dyes, phenazine dyes, acridine dyes, xanthene dyes, phenoxazine dyes, and pyronine dyes.

The catalysts described in my copending applications are also incorporated by reference. For example, these catalysts include: organic sulfinic acids and derivatives thereof such as p - toluenesulfinic acid, benzenesulfinic acid, p - bromobenzenesulfinic acid, naphthalenesulfinic acid, 4 _ acetamidobenzenesulfinic acid, 5-salicylsulfinic acid, ethanesulfinic acid, 1,4 - butanedisulfinic acid, and 2-toluene sulfinic acid; salts of these organic sulfinici acids which are compatible with other components in the light-sensitive composition such as the sodium salts, the potassium salts, the lithium salts, the magnesium salts, the calcium salts, the barium salts, the silver salts, the zinc salts, and the aluminum salts; esters of the organic sulfinic acids such as the methyl esters, the ethyl esters, the propyl esters, and the butyl esters; sulfinyl halides such as the sulfinyl chlorides and bromides, for example, ethanesulfinyl chloride and 5 - salicylsulfinyl bromide; sulfinamides, for example, ethanesulfinamide; the N - alkylsulfinamides, for example, N-methyl-p-toluenesulfinamide; and the N-aryl-sulfinamides, for example, N-phenylbenzenesulfinamide; triorgano-substituted phosphines such as tributylphosphine, triphenylphosphine, dibutylphenylphosphine, methyldiphenylphosphine, and methylbutylphenylphosphine; and triogano-substituted arsines such as triphenylarsine, methyldiphenylarsine, trioctylarsine, dibutylphenylarsine, and methylbutylphenylarsine, and the like catalyst, including mixtures thereof.

Other photocatalyst systems may also be used in the process of the present invention. Although such photocatalyst systems are much slower than those described in my copending applications, it may nevertheless be advantageous to be able to view the photopolymer image so formed by the process of this invention. Such photocatalyst systems are described in U.S. Patent No. 3,097,097 to G. K. Oster et al., and incorporated herein by reference. More specifically, the photo-oxidants include rose bengal, phloxine, erythrosin, eosin, fluorescein, acriflavine and thionine, and the reducing agents include stannous chloride, ascorbic acid, hydrazine, phenylhydrazine, and dichlorophenylhydrazine.

The method of this invention is also applicable to photosensitive compositions in which the image is produced by surface perturbations as described in my copending application filed concurrently herewith entitled "Photographic Process and Product," Ser. No. 616,587. As disclosed therein, the photosensitive compositions contain polymerizable monomers in appropriate solvents such that transparent gels are formed upon exposure of the photosensitive compositions to actinic light. The various components of the therein described compositions have been substantially described herein and are incorporated by reference.

The photosensitive compositions may be made up by adding the aforedescribed components in any order. However, once the photo-redox catalyst and vinyl monomer have been brought together, the resulting composition must be kept in the dark. Preferably, the photosensitive composition is made up as a solution. However, dispersions may be used where it is desirable to use an insoluble monomer or catalyst system. When a solution is being used, the particular solvent employed will be one which is compatible with the other components of the photosensitive composition. The following solvents may be employed where appropriate: water; alcohols such as methanol and glycerol; ethers such as ethyl ether and bis(2-methoxyethyl)ether; dioxane; toluene; and ethylene dichloride.

The relative amounts of the components of the photosensitive composition may vary greatly. In general, the amount of vinyl monomer may range from as low as $10^{-3}$ moles per liter up to the solubility of the monomer in the particular solvent used in the photosensitive composition.

The amount of catalyst will generally be very small in relation to the amount of monomer because only catalytic amounts of catalyst (as low as $10^{-6}$ moles per liter) need be used. The amount of photo-oxidant may be as low as $10^{-7}$ moles per liter, however, the photo-oxidant concentration will generally be much higher depending upon such factors as the amount of catalyst, the wavelengths of incident light and the intensity of the incident light.

The formation of photopolymer images and the viewing of such images in photosensitive media will be further illustrated by the following examples.

EXAMPLE 1

This example illustrates the additional advantage or apparent high optical density due to scattering differences, when using blue light for viewing an image in a photosensitive composition which is highly sensitive only to red light.

A photosensitive film was made by placing a photosensitive solution between two glass plates separated by a peripheral shim .006 inch thick. The photosensitive solution was prepared by mixing in the dark: 4 ml. of barium diacrylate solution (35% wt./vol, 1 ml. of $10^{-1}$ molar $AgNO_3$ solution and 1 ml. of photo-redox catalyst solution. The photo-redox catalyst solution was prepared from: 2.14 gms. of sodium p-toluenesulfinate dihydrate, 0.03 gm. of methylene blue, and 100 ml. of distilled water.

A number of photosensitive films were prepared as described above and uniformly exposed to white light from a tungsten filament lamp to give films having optical densities of approximately 0.1, 0.15 and 0.18. The films were then desensitized by storing in the dark for at least two hours at room temperature. The optical densities of each film were then measured as a function of the wavelength between 0.4 micron (4000 A.) and 0.8 micron (8000 A.), inclusive, on a Coleman, Model 14, Spectrophotometer.

Figure 2:
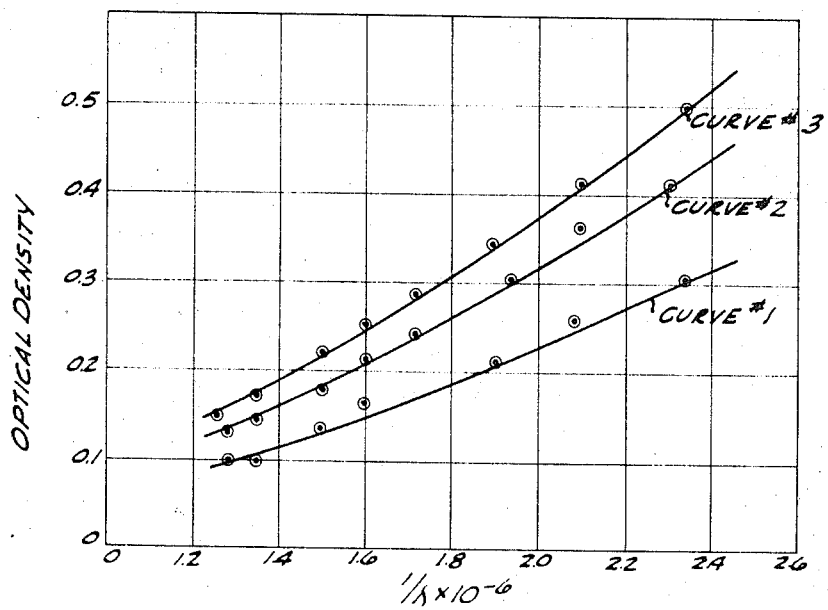
FIG. 2 is a graphical representation of the apparent increase in optical density of a photopolymer image comprising a colloidal precipitate when irradiated with visible actinic light of varying wavelengths.

In FIG. 2, there are shown experimental data in plotted points with appropriate curves calculated from the Mie equation for light scattering from colloidal particles having radii of about $3.56 \times 10^{-5}$ cm. The data from the measurements made above closely correspond to these theoretical curves.

On the film having optical density of 0.1 at 0.72 micron (7200 A.), $(1/\lambda = 1.39 \times 10^6)$ the optical density at 0.4 micron (4000 A.), $(1/\lambda = 2.5 \times 10^6)$ was .32 or an increase in apparent optical density of 3.2 times in going from red to blue (Curve 1). On a film having an optical density of 0.13 at 0.72 micron (7200 A.) the optical density at 0.4 micron (4000 A.) was 0.45, or an increase in apparent optical density of 3.4 times in going from red to blue (Curve 2). On a film having an optical density of 0.16 at 0.72 micron (7200 A.) the optical density at 0.4 micron (4000 A.) was 0.52, or an increase in apparent optical density of 3.2 times in going from red to blue (Curve 3). Curves 1, 2 and 3 illustrate a close correspondence between the experimental data (plotted points) and the calculated curves.

EXAMPLE 2

This example illustrates the effect of irradiating a photosensitive composition containing barium diacrylate as the polymerizable monomer and methylene blue as the photo-oxidant, with light of different wavelengths.

A photosensitive solution was prepared by mixing, in the dark, 4 ml. of a 35% wt./vol. solution of barium diacrylate having a pH of 6.4 and 1 ml. of photo-redox catalyst solution consisting of 2.14 gm. of sodium p-toluenesulfinate dihydrate, .03 gm. of methylene blue and 100 ml. of distilled water. A number of photosensitive films were prepared by placing the photosensitive solution between two glass plates separated by a peripheral shim. .007 inch thick.

Light from a projector containing a tungsten filament bulb was passed through one of a series of interference filter (red, green, blue and neutral). The power of the light passing through each filter was adjusted so that the intensity of the light emerging from the filter was in each case $6.25 \times 10^{-4}$ watts/cm.$^2$. The intensity was measured by a thermopile known to the trade as Eppley Thermopile Ser. No. 5,040.

A film of the photosensitive material as described above was exposed to light emerging from each filter respectively and the optical density of the precipitated polymer in the film was monitored as a function of exposure time with a photo-multiplier tube, electronic circuitry, and strip chart recorder.

FIG. 3 gives the results of the optical density vs. exposure time measurements. White light having the same intensity of $6.25 \times 10^{-4}$ watts/cm.$^2$ at the film surface was used as well as the red, green and blue filters.

It can be seen that red and white light exposure causes rapid polymerization and image formation corresponding to the absorption characteristics of the methylene blue photo-oxidant. Polymerization with green light is not as efficient and polymerization with blue light allows an image to be viewed with this light for a considerable period before polymerization ensues.

EXAMPLE 3

This example is identical to Example 2 except that in place of the barium diacrylate monomer in Example 2, a barium lead diacrylate monomer is used here in a solution of pH 9 containing 60 mole percent barium diacrylate and 40 mole percent lead diacrylate.

FIG. 4 gives the results of optical density vs. exposure time measurements. It can be seen that red and white light cause rapid development of opacity. Green light is slower and blue light is very slow even at the same light intensity as used for the white and red light.

EXAMPLE 4

This example is identical to Example 2 except that a barium cadmium diacrylate solution of pH 6.98 containing 80 mole percent barium diacrylate and 20 mole percent cadmium diacrylate is used here in place of the barium diacrylate solution of Example 2.

FIG. 5 gives the results of optical density vs. exposure time measurements. It can be seen that red and white light cause rapid photopolymerization, green light causes less rapid photopolymerization and blue light of the same intensity considerably longer to develop the corresponding optical opacity.

EXAMPLE 5

This example is identical to Example 2 except that a barium neodymium diacrylate solution of pH 6.95 containing 80 mole percent diacrylate and 20 mole percent neodymium triacrylate is used here in place of the barium diacrylate solution of Example 2.

Table 1 indicates the length of the induction period associated with each light.

TABLE 1

| Filter: | Induction period (sec.) |
| --- | --- |
| Neutral | 54 |
| Red | 42 |
| Green | 114 |
| Blue | 354 |

It can be seen from Table 1 that red and white light promote rapid photopolymerization. Green light is somewhat slower and blue light is sufficiently inactive to enable a photographic image to be viewed by projection for an adequate period of time.

As will be understood from Examples 2–5, inclusive, it is preferable, when the photosensitive composition contains a strongly red absorbing dye such as methylene blue, to employ a photopolymerization initiating light having wavelengths substantially in the red region and to employ a blue light for viewing the photopolymer in its photosensitive medium.

EXAMPLE 6

This example illustrates the effect of employing light of different wavelengths and of different intensities as the viewing light.

Photosensitive films were prepared from the barium lead diacrylate composition of Example 3, in the same manner as described in that example. However, the films were used in this example (and as contrasted with Example 3) shortly after they were prepared. I have found that freshly prepared compositions are more photosensitive than those which have been stored for some time. Therefore, the data derived from tests using freshly prepared compositions cannot be compared with data derived from tests using stored compositions except to illustrate general trends.

In the present example, the photosensitive films were exposed to light from a tungsten lamp projector having an intensity at the film surface of about $3.13 \times 10^{-3}$ watt/cm.$^2$. The light transmitted through the film was monitored in the same manner as described in Example 2. Instead of adjusting the intensity of the light coming through each of the red, green and blue filters as described in Example 2, the projector light was maintained at its initial intensity and the photosensitive film exposed to whatever light was transmitted by the filter. When using the red filter, it was found that the transmitted intensity was 0.54 of the original intensity (about $1.69 \times 10^{-3}$ watts/cm.$^2$). For the green filter, the transmitted intensity was 0.26 of the original intensity (about $0.82 \times 10^{-3}$ watts/cm.$^2$) and for the blue filter, the transmitted intensity was 0.094 of the original intensity (about $0.294 \times 10^{-3}$ watts/cm.$^2$).

Figure 6:
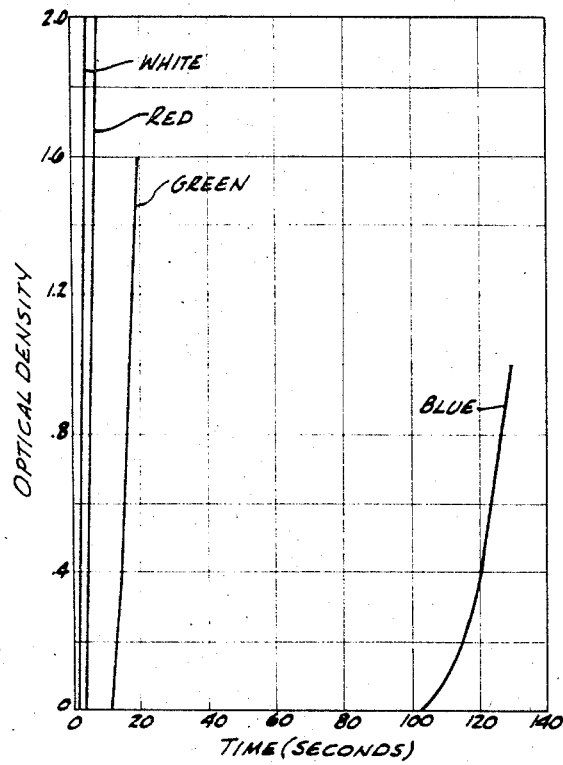
FIGS. 6, 7 and 8 are graphical representations of increases in optical density of photosensitive compositions of this invention when such compositions are irradiated with actinic light of different wavelengths and at different incident light intensities.

FIG. 6 gives a graphical representation of the optical density recorded in this example in terms of exposure time for white light and for light transmitted by each of the filters. It can be seen that polymerization and development of opacity is very slow using the blue filter. This allows an image taken with red light, for instance, to be projected with the blue filter for a considerabe period before background fogging occurs.

EXAMPLE 7

This example is the same as Example 6 except that barium neodymium acrylate monomer was substituted for the barium lead diacrylate composition of Example 6. The barium neodymium monomer solution was made up as described in Example 5, but it was used shortly after its preparation (as contrasted with Example 5).

Figure 7:
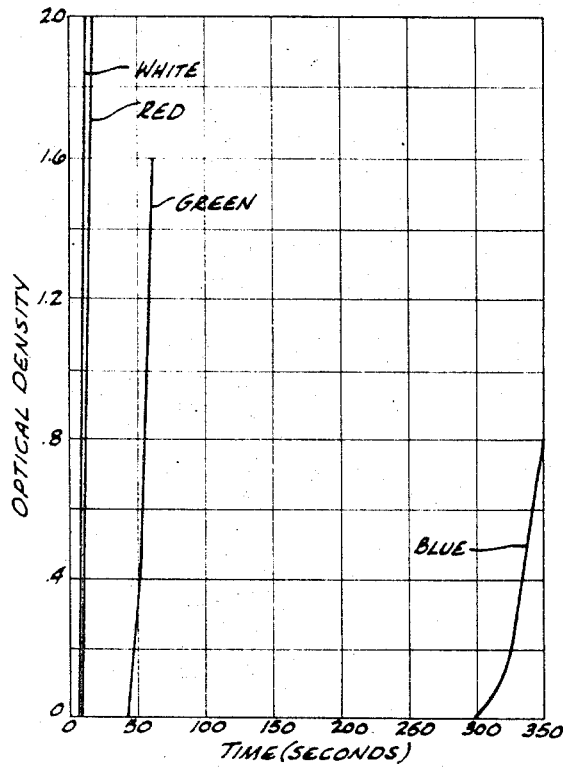

FIG. 7 is a graphical representation of the data plotted as optical density vs. exposure time. In this case, also, it can be seen that whereas white and red light bring about very rapid polymerization, blue light is relatively slow and allows projection with blue light for a considerable period without deleteriously affecting the photosensitive film bearing an image.

Examples 6 and 7 both lilustrate possible use of the experimental fact that blue light is scattered much more than red light by photopolymers consisting of colloidal particles. That is, by decreasing the intensity of the blue viewing light, the viewing time can be increased and, simultaneously, the photopolymer image can be adequately viewed even at the lower intensity because of the increased scattering of the blue light.

EXAMPLE 8

This example is the same as Example 6 except that a barium strontium diacrylate solution of pH 7 containing 80 mole percent barium diacrylate and 20 mole percent strontium diacrylate was used in place of the barium lead diacrylate solution of Example 6.

Figure 8:
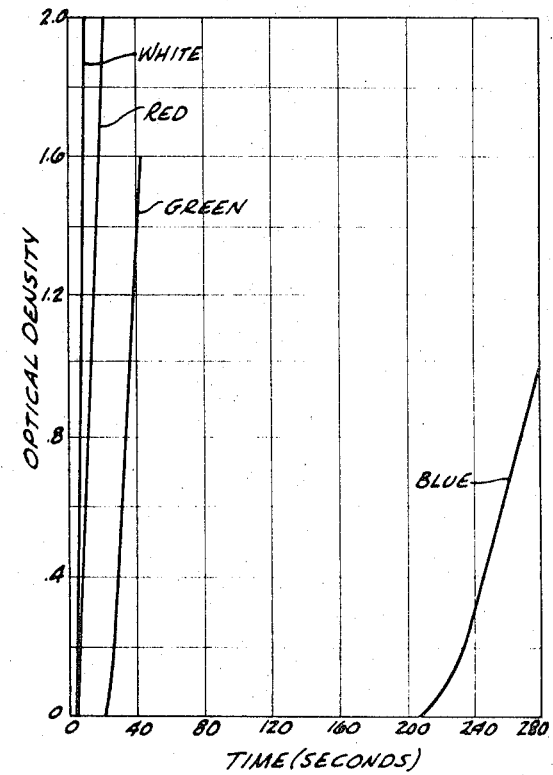

FIG. 8 gives a graphical representation of the data plotted as optical density vs. exposure time. Light through a blue filter caused only a slow development of opacity in contrast to rapid polymerization in white and red light and moderately rapid polymerization in green light.

EXAMPLE 9

This example illustrates the rapid production of a photopolymer image employing a photo-redox catalyst of my copending applications, followed immediately by a comparatively long viewing period in which the photopolymer image remained easily discernible.

A photosensitive solution was prepared by mixing, in the dark, 4 ml. of 39% by weight barium diacrylate solution (pH=5.92), and 1 ml. of photo-redox catalyst solution consisting of 2.14 gm. of sodium p-toluenesulfinate dihydrate, 0.03 gm. of methylene blue, and 100 ml. of distilled water. A photosensitive film was prepared by placing the photosensitive solution between two glass plates separated by a peripheral shim 0.007-inch thick.

A negative image was projected onto the photosensitive film. Three seconds of exposure were required to obtain a well developed positive print at the light intensity employed. The negative was replaced quickly with the blue filter described in Example 2 and the positive print projected on a screen with the blue light transmitted by the filter. No fogging occurred up to 32 seconds of projection. At 32 seconds, some fogging started, but the positive image was easily discernible up to 62 seconds of projection. From 62 seconds to 90 seconds, the print became steadily less discernible and beyond about 90 seconds, it had completely fogged out.

EXAMPLE 10

This example illustrates alternating exposure and viewing to build up a photopolymer time sequence plot which can be desensitized if desired.

A photosensitive film was prepared from the same barium diacrylate composition described in Example 9 and in the same manner.

The film was exposed to a small spot of white light having an intensity of $1.7 \times 10^{-3}$ watts/cm.$^2$ for one second. Immediately thereafter, the film was projected on a screen with blue light transmitted by the blue filter described in Example 2 for three seconds. The film was re-exposed to the small spot of white light which had been translated about one spot diameter from its original position. This re-exposure was carried out for one second and immediately thereafter, the film was projected on a screen with blue light as described above. The projection was carried out for three seconds. This sequence was repeated for a total of ten times.

During the entire time, the background remained substantially unfogged and the spots on the light-sensitive film had merged into a line whose shape corresponded to the movement of the light spot across the light-sensitive film.

As will be apparent from the foregoing description and examples, I have disclosed a novel method of viewing of a photopolymer image in a photosensitive composition, immediately upon production, for significant periods, without producing background fog. The process of this invention is completely optical and is based upon a recognition of the unique absorption capabilities of the photo-oxidants used and described herein. Because of the tendency of these photo-oxidants to strongly absorb in one region of the visible spectrum and to weakly absorb in another region of the visible spectrum, it has been shown that a photopolymer image can be produced by using light having wavelengths substantially within the strongly absorbing region of the photo-oxidant. It has further been shown that viewing of such image can be accomplished by irradiating the photosensitive composition with light having wavelengths substantially in the weakly absorbing region.

With respect to the presently known photo-oxidants, it has been shown that photopolymerization occurs best when irradiating with light in the 5400 to 7200 A. region and preferably with red light, and that viewing is best accomplished by irradiating with light in the 3800 to 5400 A. region and preferably with blue light.

It has further been shown that viewing with blue light provides two additional advantages due to its greater scattering by colloidal photopolymers. The first is that even weak images can be made readily discernible. The second advantage is associated with strong images with which weak viewing light can be used thereby extending the viewing time.

Furthermore, because the process of this invention is completely optical, desensitization and presensitization may be used in conjunction with the process of this invention without compensating for any additives. After a photopolymer image has been formed and that image has been viewed in blue light, the photosensitive medium may then be desensitized by any method which could be used if no viewing step had been employed.

Additionally, the process of this invention may be employed with the presensitization process of John B. Rust and Leroy J. Miller described in a copending application entitled "Photopolymerization Photography—Reduction of Induction Period and Product," Ser. No. 583,652, filed Oct. 3, 1966, and assigned to the instant assignee. As disclosed therein, the sensitivity of a photosensitive composition to image producing light can be increased by initially irradiating the photosensitive composition for a time less than or equal to the induction period associated with the sensitizing light. The effect of the presensitizing step is to reduce the induction period associated with any other light by a fraction equal to the ratio of the presensitizing time to the induction period associated with the presensitizing light. Thus, formation of a photopolymer image in a photosensitive composition will be effected more rapidly when the composition is initially presensitized. However, this also means that the viewing period will be decreased since polymerization, due to the viewing light, will be initiated more rapidly in a presensitized composition. Therefore, whether presensitization will be used will depend upon the requirements of each application. Further, desensitization at optimum viewing level may be obtained by control of pH or silver salt addition and heating as disclosed in copending application entitled "Photopolymer Polymerization Fixation Process and Products" of Leroy J. Miller and John B. Rust, Ser. No. 583,650, and my copending application entitled "Photopolymer Fixation Process and Products," Ser. No. 583,649.

While certain embodiments are disclosed herein, modifications which lie within the scope of this invention will occur to those skilled in the art. I intend to be bound only by the scope of the claims which follow.

What is claimed is:

1. A method for production and viewing of a photopolymer image in a photosensitive photopolymerizable film composition comprising the steps of:
    (1) providing a film of photopolymerizable composition containing a photopolymerization system capable of initiation polymerization of said composition
    (2) initially irradiating said photosensitive composition comprising:
        (a) a photopolymerizable vinyl monomer system being capable of free radical initiated addition polymerization and containing relatively smaller amounts of
        (b) an organic photo-oxidant inactive in the absence of light but sensitive to actinic light and capable of being raised to a more active photoactive or light absorptive state when irradiated with light of high intensity or radiation in the upper wavelength region of over about 5400 A.

and less photoactive when irradiated with light of low intensity or in the lower wavelength radiation in the visible viewing range of below about 5400 A. in combination with, (c) a reducing agent or catalyst selected from the group consisting of an organic sulfinic compound, a triorgano phosphine, or a triorgano arsine, said catalyst being capable of reacting with the light excited condition of said photo-oxidant to generate free radicals capable of initiating polymerization of said vinyl monomer system with actinic light of high intensity in the form of a pattern or actinic light having wavelengths lying in said higher wavelength region to rapidly produce a photopolymer image of said pattern in said photosensitive composition; and (3) further uniformly irradiating said photosensitive composition with visible light having wavelengths lying in said lower wavelength region, whereby said photopolymer image is viewed without appreciably polymerizing the initially unexposed areas of said photosensitive composition.

2. The method of claim 1 wherein said further irradiation is continued for a time less than or equal to the induction period associated with said visible light having wavelengths lying in said lower wavelength region.

3. The method of claim 1 including the step of desensitizing the composition to further photopolymerization after the imaging polymerization is affected.

4. A method for producing and viewing a photopolymer image in a photosensitive film composition comprising the steps of:

(1) initially irradiating a photosensitive photopolymerizable film composition comprising (a) a polymerizable vinyl monomer system being capable of free radical initiated photopolymerization containing a photopolymerization initiating system comprising;

(b) a photo-oxidant inactive in the absence of light and capable of being raised to a photoactive level when irradiated with actinic light having wavelengths lying in the visible region between about 3800 A. and about 7800 A., said photo-oxidant being highly sensitive to high intensity light absorption or radiation in the upper range of over about 5400 A. of said visible region and being relatively less sensitive to light of low intensity or radiation in the lower portion of said visible region in the range of less than 5400 A., said higher range of photoactive level of said photo-oxidant causing it to be capable of rapidly reacting with (c) a reducing agent or catalyst selected from the group consisting of an organic sulfinic acid compound, or salt or aromatic or aliphatic ester derivative thereof including sulfinyl halide and sulfinamides, triorgano substituted phosphine, or triorgano substituted arsine, and mixtures thereof capable of producing free radicals sufficient to initiate polymerization of said monomer system when raised to an excited state in the light activated level of said photo-oxidant, with actinic light having wavelengths lying in said high intensity or upper range portion of said visible region to form a desired photopolymer image; and (2) further uniformly irradiating said photosensitive composition with actinic light having wavelengths lying in said lower portion of said visible region, whereby said photopolymer image is viewable in said photosensitive composition substantially without background fogging.

5. The method of claim 4 wherein said further irradiation is continued for a time less than or equal to the induction period associated with said actinic light having wavelengths lying in said lower portion of said visible region.

6. The method of claim 4 including the step of desensitizing the composition to further photopolymerization after the imaging polymerization is affected.

7. The method of claim 4 wherein said photosensitive composition is presensitized prior to said initial irradiation by irradiating said photosensitive composition with actinic light for a time less than or equal to the induction period associated with said actinic light.

8. The method of claim 4 wherein said photo-oxidant is selected from the quinoidal group consisting of phenothiazine dyes, phenazine dyes, acridine dyes, xanthene dyes, phenoxazine dyes and pyronine dyes.

9. The method of claim 4 wherein said vinyl monomer is selected from the group consisting of barium diacrylate, calcium diacrylate, N,N'-methylenebisacrylamide, barium methacrylate, calcium methacrylate, vinylidene chloride, vinyl methyl ether, vinyl butyl ether, vinyl butyrate, styrene, vinyl acetate, vinyl benzoate, methyl methacrylate, vinylpyrrolidone, acrylic acid, acrylonitrile, acrylamide, lead diacrylate, neodymium triacrylate, cadmium diacrylate, and strontium diacrylate.

10. A method for producing and viewing a photopolymer image in a photosensitive film composition comprising the steps of:

(1) providing a supported photosensitive film composition of photopolymerizable ethylenically unsaturated monomers in combination with a polymerization initiator active in actinic light to generate free radical initiators of polymerization;

(2) initially irradiating said photosensitive composition which comprises:

(a) a photopolymerizable vinyl monomer film containing a photoinitiator system consisting of;

(b) a photo-oxidant inactive in the absence of light and capable of being raised to a photoactive level when irradiated with actinic light having wavelengths lying in the visible region between about 3800 A. and about 7800 A., said photo-oxidant being highly sensitive to light of high intensity or a portion of said visible region in the range above 5400 A. and being substantially less sensitive to a light of low intensity or portion of said visible region in the range below 5400 A., in combination with (c) a reducing agent or catalyst selected from the group consisting of an organic sulfinic acid compound including the salt, sulfinyl, ester or sulfinamide derivative of said acid compound, a triorgano substituted phosphine, or a triorgano substituted arsine, and mixture thereof capable of providing free radicals in the light excited state of said photo-oxidant sufficient to initiate polymerization of said monomer, with an imaging actinic light having high intensity or a wavelength lying in the range of over 5400 A. to produce a relative photopolymer image reproduction of said imaging light in said film; and (3) further uniformly irradiating said photosensitive composition containing said image reproduction with visible light of low intensity or having a wavelength of not over 5400 A. to thereby view said image without substantially effecting background fogging or further polymerization of said composition.

11. The method of claim 10 wherein the photo-oxidant is selected from the group consisting of quinoidal dyes consisting of phenothiazine dyes, phenazine dyes, acridine dyes xanthene dyes, phenoxazine dyes, and pyronine dyes.

12. The method of claim 10 wherein said further irradiation is continued for a time less than or equal to the induction period associated with said visible light having wavelengths lying between about 3800 A. and about 5400 A.

13. The method of claim 10 including the step of desensitizing further photopolymerization of said photosensitive composition at any time after said imaging irradiation.

14. The method of claim 10 wherein said photosensitive composition is presensitized prior to said initial irradiation by irradiating said photosensitive composition with actinic light for a time less than or equal to the induction period associated with said actinic light.

15. The method of clam 10 wherein said vinyl monomer is selected from the group consisting of barium diacrylate, calcium diacrylate, N,N'-methylenebisacrylamide, barium methacrylate, calcium methacrylate, vinylidene chloride, vinyl methyl ether, vinyl butyl ether, vinyl butyrate, styrene, vinyl acetate, vinyl benzoate, methyl methacrylate, vinylpyrrolidone, acrylic acid, acrylonitrile, acrylamide, lead diacrylate, neodymium triacrylate, cadmium diacrylate, and strontium diacrylate.

References Cited

UNITED STATES PATENTS

| | | | |
|---|---|---|---|
| 3,097,096 | 7/1963 | Oster | 96—115X |
| 3,244,518 | 4/1966 | Schwerin et al. | 96—115X |
| 3,380,825 | 4/1968 | Webers | 96—115X |

OTHER REFERENCES

Woodward, D. W. et al.: "Photographic Science & Engineering," vol. 7, No. 6, 1963, pp. 360–368.

RONALD H. SMITH, Primary Examiner

U.S. Cl. X.R.

96—35.1, 115